US 6,686,966 B1

(12) United States Patent  
Hashimoto (10) Patent No.: US 6,686,966 B1  
(45) Date of Patent: Feb. 3, 2004

(54) ELECTRONIC IMAGING SYSTEM (75) Inventor: Hitoshi Hashimoto, Kanagawa (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/461,935

(22) Filed: Dec. 15, 1999

(30) Foreign Application Priority Data

Dec. 17, 1998 (JP) ............................. 10-359666

(51) Int. Cl.$^7$ ..................... H04N 5/232; H04N 5/225
(52) U.S. Cl. .................. 348/348; 348/353; 348/354; 348/372
(58) Field of Search .................. 348/162, 164, 348/207.99, 222.1, 345, 347–351, 353–356, 362–365, 370–372; 396/89, 94, 96, 121, 138, 139; 250/201.1, 201.2, 201.4, 201.7, 201.8, 215; H04N 5/232, 5/225

(56) References Cited

U.S. PATENT DOCUMENTS

| 4,591,919 A | * | 5/1986 | Kaneda ..................... 348/348 |
| 4,695,893 A | * | 9/1987 | Makino ..................... 348/356 |
| 5,436,656 A | * | 7/1995 | Soga ........................ 348/354 |
| RE35,652 E | * | 11/1997 | Nonaka ..................... 396/104 |
| 5,752,093 A | * | 5/1998 | Ishiguro .................... 396/61 |
| 5,963,255 A | * | 10/1999 | Anderson ................... 348/372 |
| 5,978,027 A | * | 11/1999 | Takeda ..................... 348/351 |
| 6,154,253 A | * | 11/2000 | Kiri ........................ 348/345 |
| 6,215,961 B1 | * | 4/2001 | Mukai ...................... 396/100 |

FOREIGN PATENT DOCUMENTS

| JP | 05-002129 | * | 1/1993 | ............. G02B/7/32 |
| JP | 08-327891 | * | 12/1996 | ............ G02B/7/32 |

* cited by examiner

Primary Examiner—Ngoc-Yen Vu  
(74) Attorney, Agent, or Firm—Straub & Pokotylo; John C. Pokotylo (57) ABSTRACT

In an electronic imaging system, the focal point control is performed on the basis of the output of the high frequency component detecting means 14 when the brightness of the scene is higher than a predetermined brightness, and the focal point control is performed on the basis of the output of the light detecting means 30 when the brightness of the scene is lower than the predetermined brightness. The output of the light detecting means 30 is obtained by controlling a power supply to cut off current or supply a relatively low current flowing in the imaging means 5 and then driving the light detecting means 30 for emission of light toward the scene and reception of light reflected light from the scene.

17 Claims, 5 Drawing Sheets

ELECTRONIC IMAGING SYSTEM

BACKGROUND OF THE INVENTION

The present invention relates to electronic imaging systems and, more particularly, to electronic imaging system with improved auto-focus control.

Recently, electronic still cameras or like electronic imaging systems are popularly used, which utilizes a CCD or like imaging device for photoelectrically converting a scene image focused thereon by a photographic optical system to an electric image signal to be recorded on a recording medium or the like.

Such an electronic imaging system usually comprises an auto-focusing means (hereinafter referred to as AF means) including a focus detecting means and effective auto-focusing on the basis of the focus detection result.

A prior art auto-focusing means used for an electronic imaging system utilizes a so-called contrast detection AF means (hereinafter referred to as imager AF means), which detects the focal point of the photographic optical system by detecting the state of focus of a scene image on the basis of the difference (or contrast) of quantities of high frequency components in the image signal obtained by the imaging device. Another prior art auto-focusing means is an AF means of a so-called infrared active system (hereinafter referred to as infrared active AF means), in which the scene distance is measured by a triangular measuring method. In the triangular measuring method, an infrared light flux is emitted toward the scene, a reflected light flux therefrom is received, and the scene distance is calculated from the angle between the emitted and reflected light fluxes.

However, in an electronic imaging system with the above imager AF means, in such circumstances as a dark environment of photography or low brightness or contrast of the scene, it may sometimes be difficult to detect the state of focus of the scene image, thus possibly resulting in erroneous detection.

In order to realize the reliable focus detection even under the above circumstances, Japanese Patent Laid-Open No. 8-327891 proposes various electronic imaging systems with imager AF means, which also comprise an AF assistant light-emitting means for emitting assistant light (hereinafter referred to as AF assistant light) toward the scene. In such circumstances that erroneous focus detection may result, the AF assistant light-emitting means is controlled to emit AF assistant light toward the scene, thus always ensuring reliable focus detection.

In a focusing means disclosed in the Japanese Patent Laid-Open No. 8-327891, a light projection pattern for increasing the contrast or a predetermined frequency band of the scene, is generated according to an image signal obtained from a imaging means. In such circumstances that the scene is low in contrast or dark, the generated light projection pattern is projected toward the scene, thus increasing the contrast or the like of the scene image and greatly improving the accuracy of the focus detection.

Japanese Patent Laid-Open No. 5-2129 proposes various applications of the infrared active AF means. An electronic measuring system disclosed in this publication uses a scene distance measuring means, in which an infrared light flux or the like is emitted through a lens toward the scene, and the reflected light flux therefrom is made to be incident on a photographic optical system and thence on an imaging device (or CCD). A signal representing the scene distance is obtained from the position of incidence of light on the imaging device, size of the incident light pattern, etc., and the state of focus is detected according to the signal thus obtained.

Various further electronic imaging systems heretofore proposed comprise a plurality of AF means, which are switched to select an adequate one as desired.

However, in the above prior art electronic imaging systems performing the focus detection through the AF assistant light-emitting means or the infrared active AF means, it is necessary to supply great power to the component elements of these means.

In normal imaging operation, an imaging section of the imaging device (or CCD) is continuously driven, and this means that usually the power is always supplied to the components of the section. Therefore, depending on the circumstance of photography, the power may have to be supplied to the above AF assistant light-emitting means or the infrared active AF means while continuing the power supply to the imaging section. A power supply having a greater capacity is thus necessary.

However, in view of the portability and the ready availability, the drive power supply used for driving the prior art electronic imaging system, is usually a small-size battery such as a dry battery having relatively low capacity. Therefore, it is conceivable that when an excessive power supply state is brought about, the power supply voltage is tentatively reduced to result in an unstable state or disabling of the operation of the system itself. In addition, when the power supply to the imaging section, the AF assistant light-emitting means, the infrared active AF means, etc. is concentrated at a point, an extreme current peak increase may occur, possibly resulting in erroneous operation or operation failure.

SUMMARY OF THE INVENTION

In view of the background as described above, the present invention has an object of providing an electronic imaging system, which comprises an imager AF means and an infrared active AF means, these AF means being capable of being automatically switched to select an optimal AF means as desired, thus permitting more accurate focus detection and also power consumption saving to contribute to energy saving while always ensuring a stable power supply state.

According to a first aspect of the present invention, there is provided an electronic imaging system comprising: a photographic optical system for focusing a scene image; an imaging means for converting the scene image focused by the photographic optical system to an image signal; a high frequency component detecting means for detecting high frequency components of the image signal obtained by the imaging means; a light detecting means including a light-emitting means for emitting light toward the scene and a light-receiving means for receiving light emitted by the light-emitting means and reflected from the scene; a driving means for controlling the focal point of the photographic optical system; a brightness detecting means for detecting the brightness of the scene; and a drive control means for controlling the driving means on the basis of the output of the high frequency detecting means or the light detecting means; wherein the focal point control is performed on the basis of the output of the high frequency component detecting means when detecting, from the result of detection in the brightness detecting means, that the brightness of the scene is higher than a predetermined brightness, and the focal point control is performed on the basis of the output of the light detecting means when detecting, from the result of detection in the brightness detecting means, that the brightness of the scene is lower than the predetermined brightness, the output of the light detecting means being obtained by controlling a power supply to cut off current or supply a relatively low current flowing in the imaging means and then driving the light detecting means for emission of light toward the scene and reception of light reflected light from the scene.

According to a second aspect of the present invention, there is provided an electronic imaging system comprising: a photographic optical system for focusing a scene image; an imaging means for converting the scene image focused by the photographic optical system to an image signal; an image display means for displaying the image signal obtained by the imaging means; a recording means for recording the image signal obtained by the imaging means; a high frequency component detecting means for detecting high frequency components of the image signal obtained by the imaging means; a light detecting means including a light-emitting means for emitting light toward the scene and a light-receiving means for receiving light emitted by the light-emitting means and reflected from the scene; a driving means for controlling the focal point of the photographic optical system; a brightness detecting means for detecting the brightness of the scene; and a drive control means for controlling the driving means on the basis of the output of the high frequency detecting means or the light detecting means; wherein the focal point control is performed on the basis of the output of the high frequency component detecting means when detecting, from the result of detection in the brightness detecting means, that the brightness of the scene is higher than a predetermined brightness, and the focal point control is performed on the basis of the output of the light detecting means and the recorded image is displayed on the image display means when detecting, from the result of detection in the brightness detecting means, that the brightness of the scene is lower than the predetermined brightness, the output of the light detecting means being obtained by controlling a power supply to cut off current or supply a relatively low current flowing in the imaging means and then driving the light detecting means for emission of light toward the scene and reception of light reflected light from the scene.

According to a third aspect of the present invention, there is provided an electronic imaging system which further comprises: a photographic optical system for focusing a scene image; an imaging means for converting the scene image focused by the photographic optical system to an image signal; a high frequency component detecting means for detecting high frequency components of the image signal obtained by the imaging means; a light detecting means including a light-emitting means for emitting light toward the scene and a light-receiving means for receiving light emitted by the light-emitting means and reflected from the scene; a driving means for controlling the focal point of the photographic optical system; a brightness detecting means for detecting the brightness of the scene; and a drive control means for controlling the driving means on the basis of the output of the high frequency detecting means or the light detecting means; and a battery voltage detecting means for detecting the voltage of a power supply battery; wherein the focal point control is performed on the basis of the output of the high frequency component detecting means when detecting, from the result of detection in the brightness detecting means, that the brightness of the scene is higher than a predetermined brightness, and the focal point control is performed on the basis of the output of the light detecting means when detecting, from the result of detection in the brightness detecting means, that the brightness of the scene is lower than the predetermined brightness, and also detecting that the result of detection in the battery voltage detecting means is lower than a predetermined value, the output of the light detecting means being obtained by controlling the power supply battery to cut off current or supply a relatively low current flowing in the imaging means and then driving the light detecting means for emission of light toward the scene and reception of light reflected from the scene.

Other objects and features will be clarified from the following description with reference to attached drawings.

PREFERRED EMBODIMENTS OF THE INVENTION

Preferred embodiments of the present invention will now be described with reference to the drawings.

Figure 1:
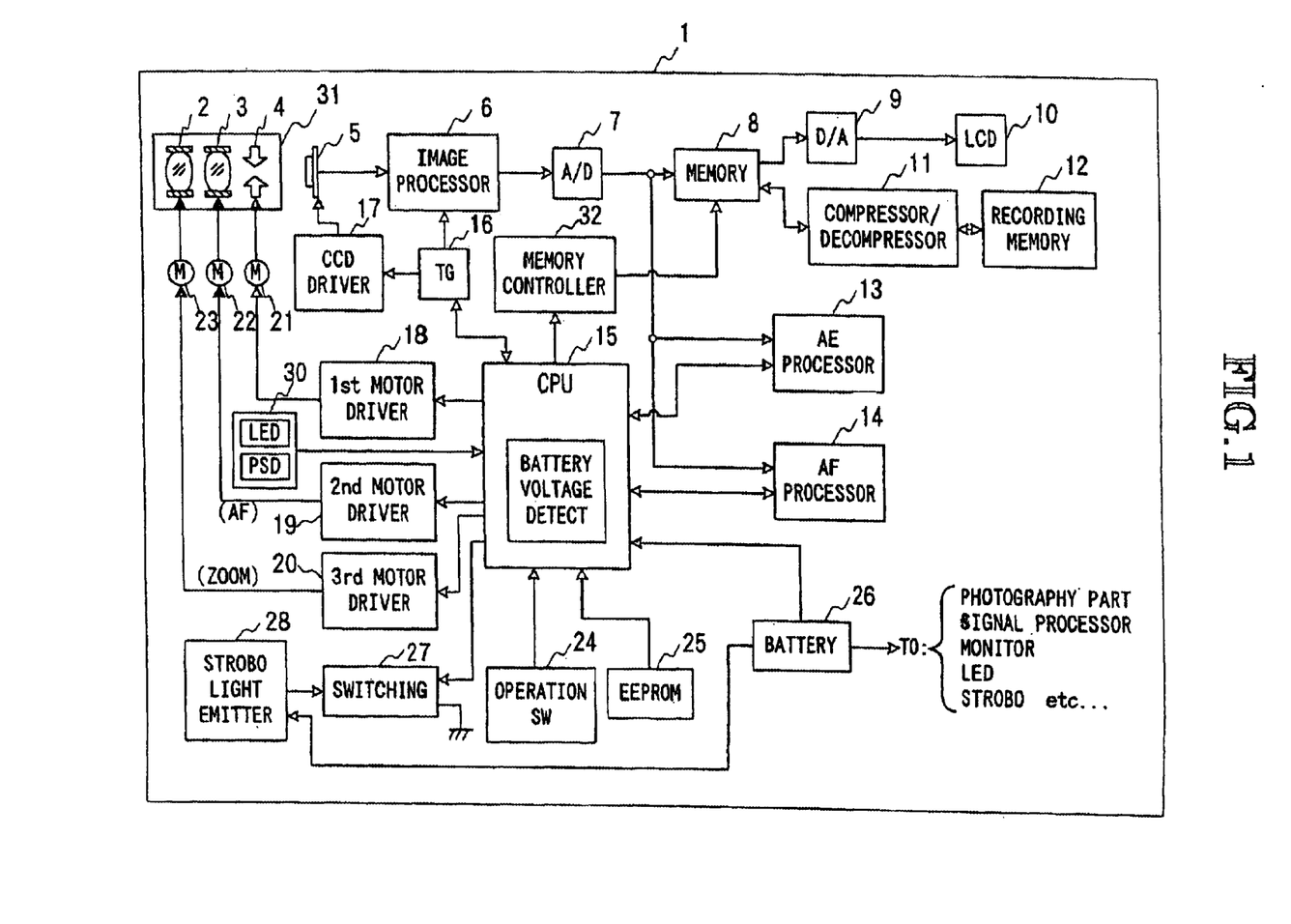
FIG. 1 is a block diagram showing a first embodiment of the electronic imaging system according to the present invention.

FIG. 1 is a block diagram showing a first embodiment of the electronic imaging system according to the present invention.

The illustrated embodiment of the electronic imaging system 1 comprises a photographic lens cylinder 31, an imaging device or charge-coupled device (hereinafter referred to CCD) 5, an image processor 6, an A/D converter 7, a buffer or like memory 8, a D/A converter 9, a memory controller 32, a liquid crystal or like image display (hereinafter referred to as LCD) 10, a recording memory 12, a compressor/de-compressor 11, a control means such as a central processing unit (hereinafter referred to as CPU) 15, an AE signal processor 13, an AF signal processor 14, a timing signal generator (hereinafter referred to as TG) 16, a CCD driver 17, a first motor 21, a first motor drive 18, a second motor 22, a second motor drive 19, a third motor 23, a third motor drive 20, a power supply battery (hereinafter referred to as battery) 26, an EEPROM 25, an operating switch group 24, a strobo light emitter 28, a switching circuit 27 and an infrared active AF signal generator 30.

The imaging lens cylinder 31 includes a photographic optical system, which has a zoom lens group 2 constituting a magnifying (or zooming) optical system and a focusing lens group 3 constituting a focusing optical system), and a stop means 4 which serves as light intensity control means for controlling the light intensity of a light flux transmitted through the imaging optical system and also as exposing means.

The CCD 5 is an imaging means for photo-electrically converting a scene image focused on it from the imaging optical system. The image processor 6 generates a predetermined image signal by executing various imaging processes on an electric signal obtained by the CCD 5. The A/D converter 7 converts the image signal (i.e., analog signal) generated in the image processor 6 to a digital signal. The memory 8 is a tentative storage means for storing the digital image signal received from the A/D converter 7. The memory controller 32 controls the memory 8.

The D/A converter 9 reads out the image signal tentatively stored in the memory 8, and converts the read-out image signal to an analog signal and also to a form permitting reproduction of image to be displayed. The LCD 10 displays the image signal as the image.

The recording memory 12 is a semiconductor memory or the like, and serves as a recording medium for recording the image signal or like data. The compressor/de-compressor 11 includes a compressor, which reads out the image signal tentatively stored in the memory 8 and executes data processing such as compression and coding on the read-out image signal to a form permitting recording on the recording memory 12, and a de-compressor, which reads out the image data recorded in the recording memory 12 and executes decoding and de-compression of the read-out image data to the best form or the reproduction and display.

The CPU 15 controls the entire electronic imaging system 1. The AE signal processor 13 detects an AE signal necessary for executing auto-exposure (AE) on the basis of the output from the A/D converter 7. The AF signal processor 14 likewise receives the output of the A/D converter 7, and detects an AF signal necessary for executing auto-focusing (AF). The TG 16 generates predetermined timing signals. The CCD driver 17 executes drive control of the CCD 5.

The first motor 21 is a stop means drive motor for driving the stop means 4. The first motor drive 18 executes the drive control of the first motor 21.

The second motor 22 is a drive means for driving the focus lens group 3 and also serves as a focus motor. The second motor drive 19 is a drive control means for executing drive control of the second motor 22.

The third motor 23 is a zoom lens motor for driving the zoom lens group 2. The third motor drive 20 executes drive control of the third motor 23.

The battery 26 supplies the power to various electric circuits or parts in the electronic imaging system 1. The EEPROM 25 is an electrically re-writable read-only or like memory, which is electrically connected to the CPU 15, and in which programs for various controls by the CPU 15 and also data used for various operations are stored.

The operating switch group 24 is electrically connected to the CPU 15, and includes various operating switches for generating command signals transmitted to the CPU 15 for various operations. The strobo light emitter 28 is a strobo light emitting means for emitting illumination light toward the scene. The switching circuit 27 is a light emission control means for controlling flash light emission from the strobo light emitter 28.

The infrared active AF signal generator 30 is an infrared light detecting means, which includes a light-emitting diode (LED) or like light-emitting means for emitting infrared light toward the scene and a position sensing device (PSD) as receiving means for receiving reflected LED emission light from the scene, and outputs a signal corresponding to the output of the PSD, i.e., the distance of the scene (hereinafter referred to as scene distance).

As the recording medium 12 for recording image data or the like in the electromagnetic imaging system 1, various media may be used, such as flash memories or like fix-type semiconductor memories and card or stick flash memories or like semiconductor memories detachably mounted in the system, as well as magnetic storage media, e.g., hard discs and floppy discs. As the recording medium of the embodiment of the electronic imaging system 1, the recording memory 12 such as a semiconductor memory is used.

The operating switch group 24 may include a main power supply switch for generating a command signal for starting the electronic imaging system 1 and supplying the power thereto, a release switch for generating a command signal for starting the imaging operation (i.e., recording operation), a play switch for generating a command signal for starting a reproducing operation and zoom switches (i.e., zoom-up and zoom-down switches) for generating command signals for starting multiplying operation by causing movement of the zoom lens group 2 in the imaging optical system.

The release switch used is a usual two-stage switch, which has a 1-st stage switch (hereinafter referred to as 1-st release switch) for generating a command signal for starting an AE and an AF process prior to the imaging operation, and a 2-nd stage switch (hereinafter referred to as 2-nd release switch) for generating a command signal for starting the actual exposure process.

The functions of the embodiment of the electronic imaging system having the above construction will now be described.

A light flux coming from a scene and incident on the photographic optical system in the photographic lens cylinder 31 in the electronic imaging system 1 (hereinafter referred to as scene light flux), is transmitted through the optical system, and its light intensity is then adjusted by the stop means 4 before it is incident on the light-receiving surface of the CCD 5 to focus a scene image thereon. The stop means 4 is open in the normal state or in the AE process which is executed upon reception of the 1-st release signal, and is driven when executing the exposure process (i.e., process in step S7 in FIG. 2 to be described later), which is started upon reception of the 2-nd release signal.

The CCD 5 photo-electrically converts the scene image focused on its light-receiving surface to an electric signal and supplies the converted signal to the image processor 6. The image processor 6 executes various processes on the signal inputted from the CCD 5, thus generating a predetermined image signal. The A/D converter 7 converts this image signal to a digital signal (i.e., image data), which is tentatively stored in the memory 8.

The D/A converter 9 reads out the image data stored in the memory 8, and converts the read-out image data to an analog signal and also to an image signal having an optimal form for reproducing image, which is displayed on the LCD 10. When the system is in a photographic mode, the LCD 10 continuously displays the image signal obtained from the CCD 5, and thus serves the role of a view-finder means for determining a scope of photography.

In the exposure process executed upon reception of the 2-nd release signal, at the instant of generation of the command signal for this process the image data stored in the memory 8 is also outputted to the compressor/de-compressor 11 for compression in the compressor and subsequent conversion to an optimal form for recording. The image data thus obtained is recorded in the recording memory 12.

When a play switch (not shown) in the operating switch group 24, for generating a command signal for the reproducing operation, is turned on, the reproducing operation is started. The compressed image data recorded in the recording memory 12 is thus outputted to the compressor/de-compressor 11 for decoding and de-compressing in the de-compressor before being outputted to and tentatively stored in the memory 8. The compressed image data is also outputted to the D/A converter 9 for conversion to an analog signal and also to an optical form for playback display on the LCD 10.

The digital image data outputted from the A/D converter to the memory 8, is also outputted to the AE signal generator 13 and the AF signal generator 14.

Responsive to receipt of the digital image data, the AE signal processor 13 executes accumulation and other computation for the brightness value of one image data frame, thus obtaining an AE evaluation value corresponding to the brightness of the scene. The AE evaluation value is outputted to the CPU 15. It will be seen that the AE signal processor serves the role of a brightness detector for detecting the brightness of the scene on the basis of the image signal obtained from the CCD 5.

Responsive to receipt of the digital image data, the AF signal processor 14 extracts a high frequency component of one image data frame through a high-pass filter (HPF), and executes accumulation and other computational processes on the HPF output data, thus obtaining an AF evaluation value corresponding to a high frequency side contour component quantity or the like. The AF evaluation value is outputted to the CPU 15. It will be seen that the AF signal processor 14 serves the role of a high frequency component detecting means for detecting a predetermined high frequency component from the image signal obtained from the CCD 5 during the AF process.

The TG 16 outputs a predetermined timing signal to the CPU 15, the image processor 6 and the CCD driver 17. The CPU 15 executes various controls in synchronism to this timing signal. The image processor 6 executes color signal separation and various other image processes in synchronism to the received timing signal from the TG 16. The CCD driver 17 executes the drive control of the CCD 5 in synchronism to the received timing signal from the TG 6.

The CPU 15 controls the first to third motor drives 18 to 20, thus effecting the drive control of the stop means 4, the focusing lens group 3 and the zoom lens group 2 via the first to third motors 21 to 23.

Specifically, the CPU 15 executes AE control, that is, it controls the first motor drive 18 to drive the first motor 21 on the basis of the AE evaluation value calculated in the AE signal processor 13, thus controlling the stop extent in the stop means 4 to a proper extent.

The CPU 15 also executes AF control, that is, it controls the second motor drive 19 to drive the second motor 22 for driving the focusing lens group 3 on the basis of the AF evaluation value calculated in the AF signal processor 14 or the output of the infrared active AF signal generator 30, thus moving the focusing lens group 3 to a position corresponding to the state of focus. The second motor 22 and the second motor drive 19 thus serve the role of a focusing means for executing a focusing operation by driving the focusing lens group 3.

When a zoom switch (not shown) in the operating switch group 24 is operated, the CPU 15 receives a signal from this switch and executes zoom control, that is, it controls the third motor drive 20 to drive the third motor 23 on the basis of the switch signal, thus moving the zoom lens group 2 in the optical axis direction. The third motor 23 and the third motor drive 20 thus serve the role of a zooming means for causing a magnifying (or zooming) operation of the photographic optical system by moving the zoom lens group 2.

Furthermore, the CPU 15 controls the infrared active AF signal generator 30 as infrared light detecting means, that is, it causes emission of an infrared light flux from the light-emitting means (LED) toward the scene. The emitted infrared light flux from the LED is reflected by the scene, and the light-receiving means (PSD) receives the reflected light flux form the scene. The infrared active AF signal generator 30 outputs a signal representing the distance of the scene on the basis of the output of the PSD. Receiving the signal from the infrared active AF signal generator 30, the CPU 15 calculates the distance of the scene by executing a predetermined computation.

The battery 26 supplies adequate power, when necessary, to various electric circuits of the electronic imaging system, i.e., the imaging unit constituted by the CCD 5 and the image processor 6, the AE and AF signal processors 13 and 14, the motors 21 to 23, the motor drives 18 to 20, the strobo light emitter 28, the switching circuit 27 and the infrared active signal generator 30. In FIG. 1, the battery 26 means is a unit, which includes a power supply battery itself such as a dry battery and a power supply control circuit for controlling the battery.

The battery 26 is electrically connected to and controlled by the CPU 15. The CPU 15 further has a battery checking function, i.e., a battery voltage detecting function permitting the detection of the residual capacity of the battery 26.

Figure 3:
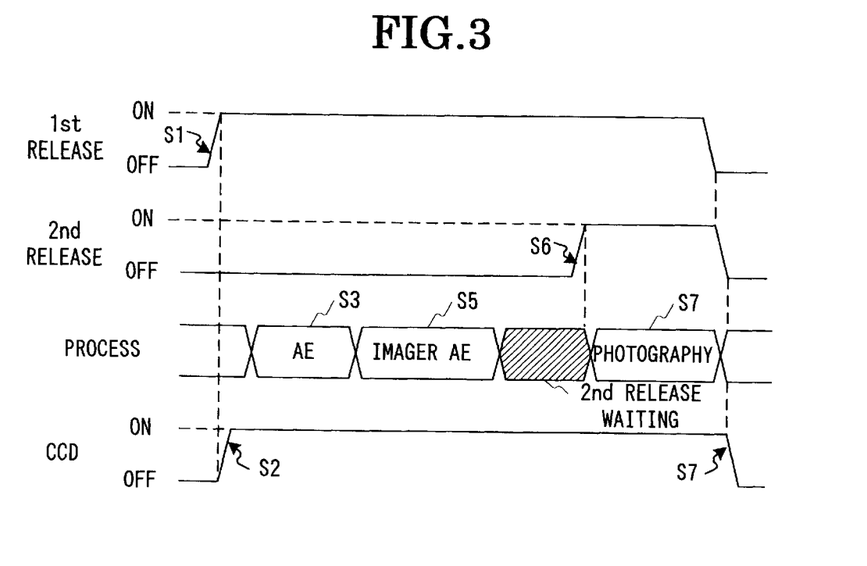
FIG. 3 illustrates signals when the AF detector is used.
Figure 4:
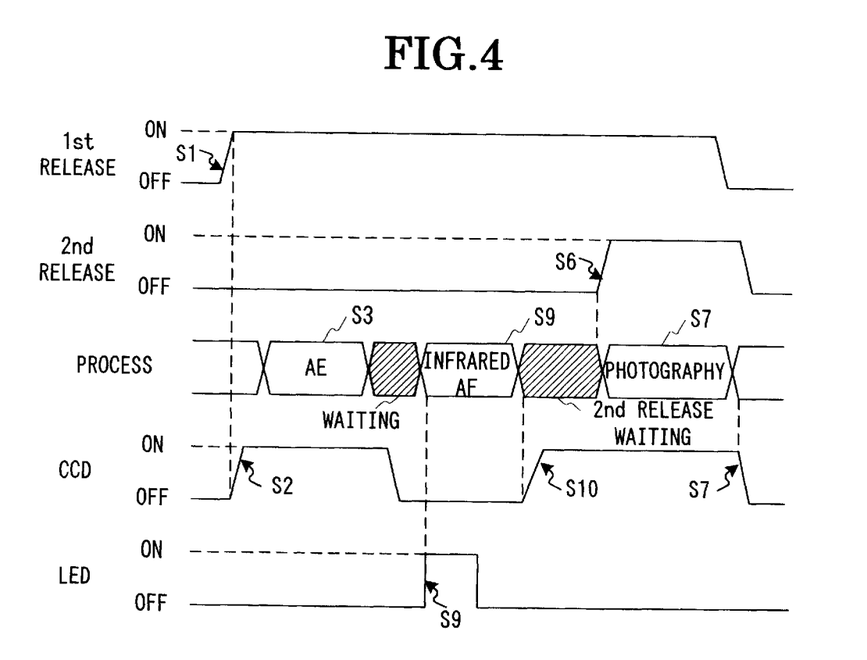
FIG. 4 illustrates signals when the infrared active AF detector is used.

The function of the embodiment of the electronic imaging system when executing a imaging process will now be described with reference to the flow chart of FIG. 2 and time charts of FIGS. 3 and 4.

Figure 2:
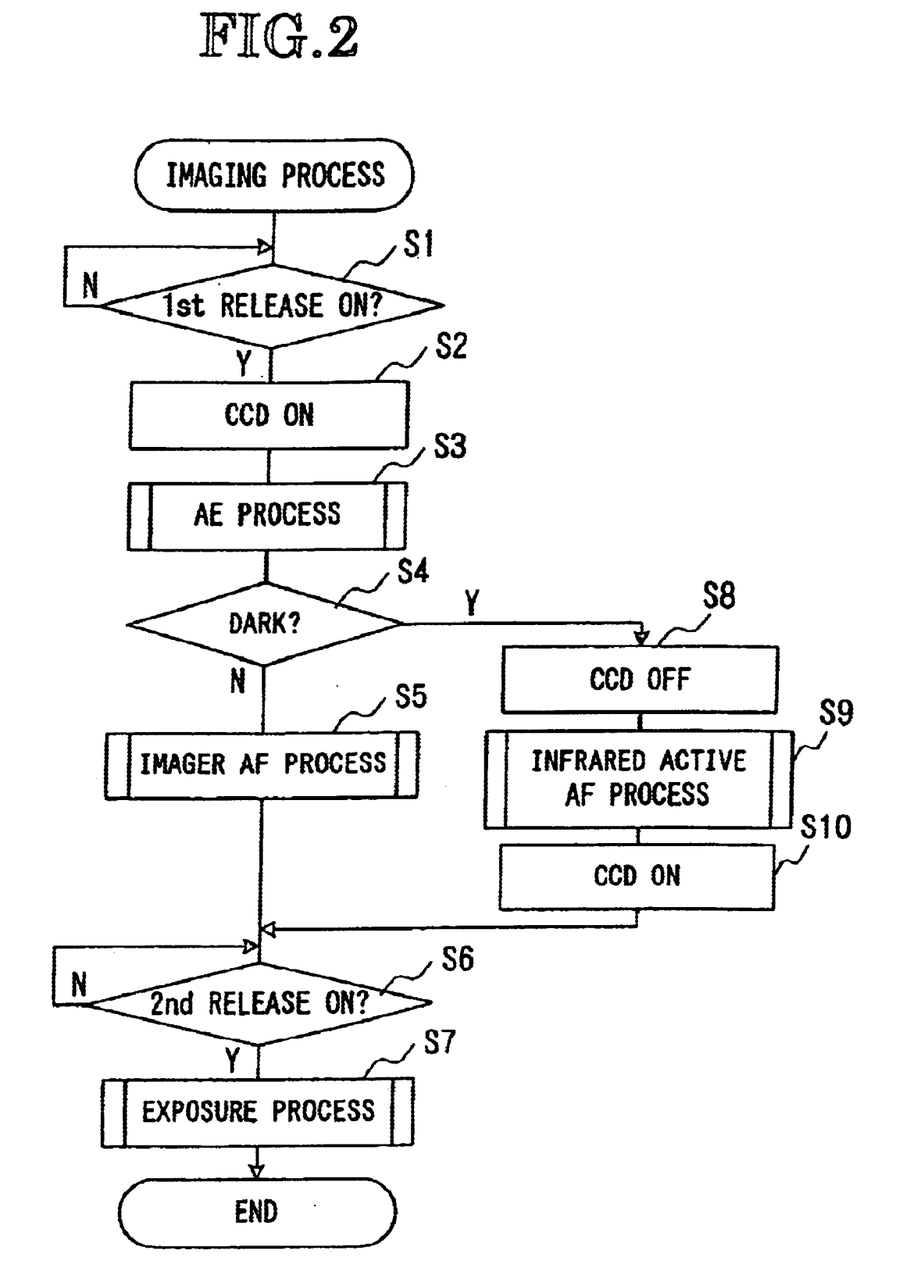
FIG. 2 is a flow chart illustrating a routine executed in this embodiment of the electronic imaging system when executing the imaging process.

FIG. 2 is a flow chart illustrating a routine executed in this embodiment of the electronic imaging system when executing the imaging process. The time charts of FIGS. 3 and 4 illustrate various signals appearing in imaging operations of the embodiment of the electronic imaging system. FIG. 3 illustrates signals when the AF detector is used, and FIG. 4 illustrates signals when the infrared active AF detector is used. In FIGS. 3 and 4, S symbol numbers correspond to the step numbers in the routine shown in FIG. 2.

This routine, i.e., imaging process sequence, is executed when the main power supply switch of the electronic imaging system 1 is "on" and the system 1 is in the imaging (i.e., recording) mode and ready for imaging. In this state, the power supply to the CCD 5 is "off", that is, no power is supplied thereto.

In this state, the CPU 15 checks the state of the 1-st release switch (step S1). When the CPU 15 detects that the 1-st release switch has been turned on in a release switch operation by the user, it controls the battery 26 to start the power supply to the CCD 5 (step S2). In subsequent step S3, the CPU 15 executes the normal AE process. In this process, data concerning the brightness of the scene (i.e., brightness data) is obtained by the AE signal processor 13.

In subsequent step S4, the CPU 15 makes a check with reference to the result of the AE process as to whether the photographic image containing a desired scene to be photographed is dark. The reference of the check as to whether the photographic image is dark, is a value of brightness or like data, and is referred to in the check as to whether reliable focus detection is obtainable in the AF process executed by using an imager AF means. For example, the reference value is preliminarily set on the basis of experimentally obtained data, and it is preliminarily stored in the EEPROM 25. The CPU 15 executes the check in the step S4 by comparing the result of the AE process with the reference value read out from the EEPROM 25.

When detecting in the step S4 that the photographic image containing the desired scene to be photographed is dark, the CPU 15 executes step S8 for executing an infrared active AF process.

In the step S8, the CPU 15 controls the battery 26 to turn off the power supply to the CCD 5, and then it executes step S9 of the infrared active AF process. Subsequent to the infrared active AF process, the CPU 15 turns on the power supply to the CCD 5 again (step S10), and then executes step S6.

When detecting in the step S4 that the scene is sufficiently bright, the CPU 15 executes step S5 of normal imager AF process, and then executes the step S6. At this time, the power supply to the CCD 5 is continuously held "on".

After execution of the predetermined AF process in the above way, the CPU 15 executes the step S6. In the step S6, the CPU 15 checks whether a command signal from the 2-nd release signal is present. When detecting this signal, the CPU 15 executes subsequent step S7 of actual exposure process. After the actual exposure process the CPU 15 controls the battery 26 to turn off the power supply to the CCD 5, thus bringing an end to the imaging process sequence.

As has been shown, in the first embodiment of the AF means is switched according to the result of the AE process, i.e., whether or not the scene is bright, and when it is detected that the scene is dark, the power supply to the CCD 5 is held "off" during the AF process in the execution of the focus detection by using the infrared active AF means 30.

In other words, the power supply to the CCD 5 is held "off" when the scene is being illuminated by infrared light emitted from the LED as the light-emitting means of the infrared active AF means 30. Thus, it is possible to suppress overload on the battery 26. It is thus possible to always obtain stable power supply, thus preventing erroneous operations of various circuits due to overload, i.e., excessive power consumption. In addition, it is possible to save power consumption, thus contributing to energy saving.

In the above first embodiment, the power supply to the CCD 5 is held "off", i.e., no power is supplied thereto, during the AF process in the execution of the focus detection by using the infrared active AF means 30 when the photographic image is dark. However, with the power supply to the CCD 5 perfectly held "off", a certain start time becomes necessary when resuming the power supply to the CCD 5 after the completion of the AF process. That is, in this case a so-called lag time is generated until the start of the subsequently executed exposure process.

Accordingly, when executing the AF process, the CCD 5 may be switched to a stand-by state with low power, i.e., low current, supplied to it instead of perfectly turning off the power supply to it. By the term "stand-by state" is meant a state, in which the CCD 5 is held with all clock inputs to it held "off" although it is supplied with power so that it is ready to resume operation as soon as a predetermined clock is inputted to it.

With this arrangement, the CCD 5 can be re-started to be in its operative state as soon as it receives a resumption command in the step S10 in FIG. 2. Thus, upon generation of a command signal from the 2-nd release switch, the exposure process can be immediately started, and any time lag due to any resumption time in the CCD 5 can be precluded.

A second embodiment of the electronic imaging system according to the present invention will now be described.

This embodiment of the electronic imaging system basically has the same construction as the previous first embodiment. In the first embodiment, either the infrared active AF process or the imager AF process is selected according to the result of the AE process in the imaging process sequence. The second embodiment is different in that the AF process switching is controlled more finely with reference to the voltage across the battery 26, i.e., residual capacity thereof, as detected by the control means (CPU) 1 by utilizing the own battery voltage detecting function. Thus, the construction of this embodiment is not particularly shown, but FIG. 1 is referred to. The function of this embodiment also is the same in some portion as of the first embodiment, and the like portion will be described only briefly.

Figure 5:
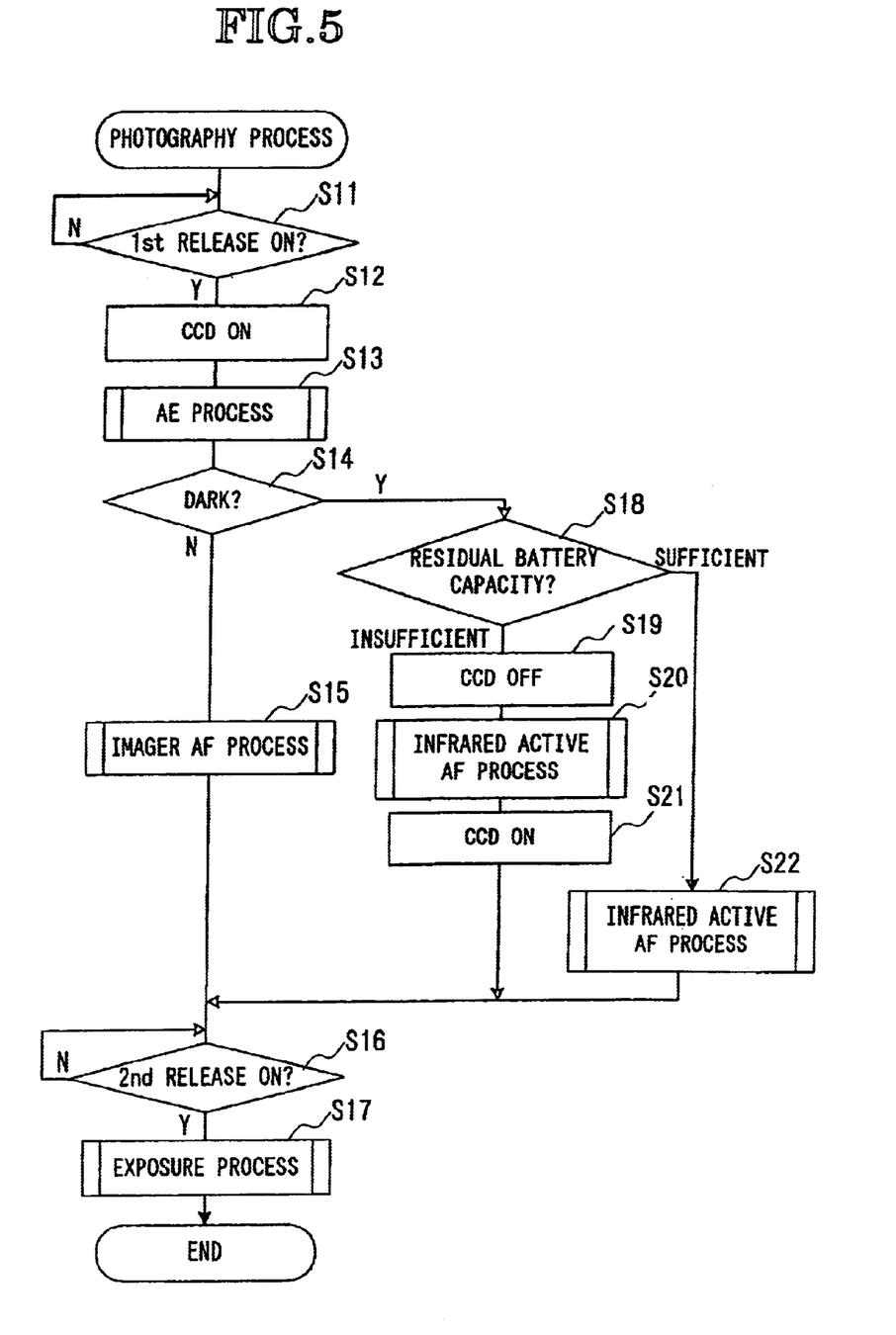
FIG. 5 is a flow chart illustrating a routine executed in this embodiment of the electronic imaging system when executing the imaging process.

FIG. 5 is a flow chart illustrating a routine executed in this embodiment of the electronic imaging system when executing the imaging process.

Again in this embodiment, the imaging process sequence is executed when a main power supply switch of the electronic imaging system 1 is "on" and the system 1 is in a imaging (i.e., recording) mode and ready for imaging. In this state, again the power supply to the CCD 5 is "off".

In this state, the CPU 15 checks the state of the 1-st release switch (step S11). When detecting that the 1-st release switch has been turned on, the CPU 15 causes the start of the power supply to the CCD 5 (step S12). In subsequent step S3, the CPU 15 executes the normal AE process, thus obtaining brightness data or the like.

In subsequent step S14, the CPU 15 makes a check with reference to the result of the AE process as to whether the photographic image containing a desired scene to be photographed is dark. When detecting that the photographic image is sufficiently bright, the CPU 15 executes step S15 of the normal imager AF process, and then executes step S16. At this time, the power supply to the CCD 5 is continuously held "on".

In the step S16, the CPU 15 checks whether a command signal from the 2-nd release switch is present. When detecting this signal, the CPU 15 executes subsequent step S17 of the actual exposure process. After the actual exposure process the CPU 15 switches the CCD 5 to a state with no power supplied thereto or to the stand-by state, thus bringing an end to the imaging process sequence.

It will be seen that the imaging process sequence executed by adopting the imager AF process (i.e., steps S11 to S17 in FIG. 5), is entirely the same as like sequence in the first embodiment (i.e., steps S1 to S17 in FIG. 2).

When detecting in the step S14 that the photographic image containing the desired scene to be photographed is dark, the CPU 15 executes step S18 for executing the infrared active AF process.

In the step S18, the CPU 15 detects the residual capacity of the battery 26 by using its battery voltage detecting function, and compares the detection result (i.e., residual battery capacity) and a predetermined reference capacity of the battery 26. The reference capacity of the battery 26 is a predetermined capacity value, which ensures reliable execution of the operation of the infrared active AF signal generator 30 while supplying power to the CCD 5. This value is preliminarily set according to experimentarily obtained or like data, and is preliminarily stored in the EEPROM 25. The CPU 15 executes the check process step S18 by reading out the reference value read out from the EEPROM 25 and comparing the detection result obtained by the power supply voltage detecting function with the read-out reference value.

Detecting in the step S18 that the residual capacity of the battery 26 is sufficient, the CPU 15 executes step S20 of the infrared active AF process. At this time, the power supply to the CCD 5 is continuously held "on". After the infrared active AF process, the CPU 15 executes the step S16 and the following steps as described above.

Detecting in the step S18 that the residual capacity of the battery 26 is insufficient, the CPU 15 executes step S19. In the step S19, the CPU 15 controls the battery 26 to switch the CCD 5 to the state with no power supplied thereto or to the stand-by state (CCD-OFF). In subsequent step S20, the CPU 15 executes the infrared active AF process. After completion of the infrared active AF process, the CPU 15 turns on the power supply to the CCD 5 again, and then executes the step S16 and the following steps as described above.

In the above way, this embodiment of the electronic imaging system executes the photographic process sequence by using the infrared active AF signal generator 30.

As described above, with the second embodiment it is possible to obtain the same effects as obtainable with the first embodiment described earlier. In addition, since the CCD 5 is switched in connection to its power supply when executing the infrared active AF process on the basis of the result of detection by the power supply voltage detecting function of the CPU 15, i.e., the residual capacity of the battery 26, it is possible to realize a more reliable AF process. Furthermore, it is possible to efficiently use the power of the battery 26, thus further contributing to the energy saving.

In the above first and second embodiments, the CCD 5 is controlled to be in the no power supply state or the stand-by state during execution of the infrared active AF process (see steps S8 to S10 in FIG. 2 or steps S19 to S21 in FIG. 5). In this case, during the execution of the infrared active AF process, it is prohibited to obtain image signal from the CCD 5. Thus, at this time no image signal is supplied to the LCD 10, and no image is displayed thereon. This means that at this time the LCD 10 can not be utilized as a view-finder means for confirming the scope of photography in the imaging operation, thus spoiling the sense of use of the electronic imaging system.

A third embodiment of the electronic imaging system according to the present invention will now be described, which gives consideration to the above deficiency. This embodiment of the electronic imaging system basically has the same construction as the previous first embodiment. Thus, the construction of this embodiment is not particularly shown, but FIG. 1 is referred to. The function of this embodiment also is the same in some portion as of the first embodiment, and the like portion will be described only briefly.

Figure 6:
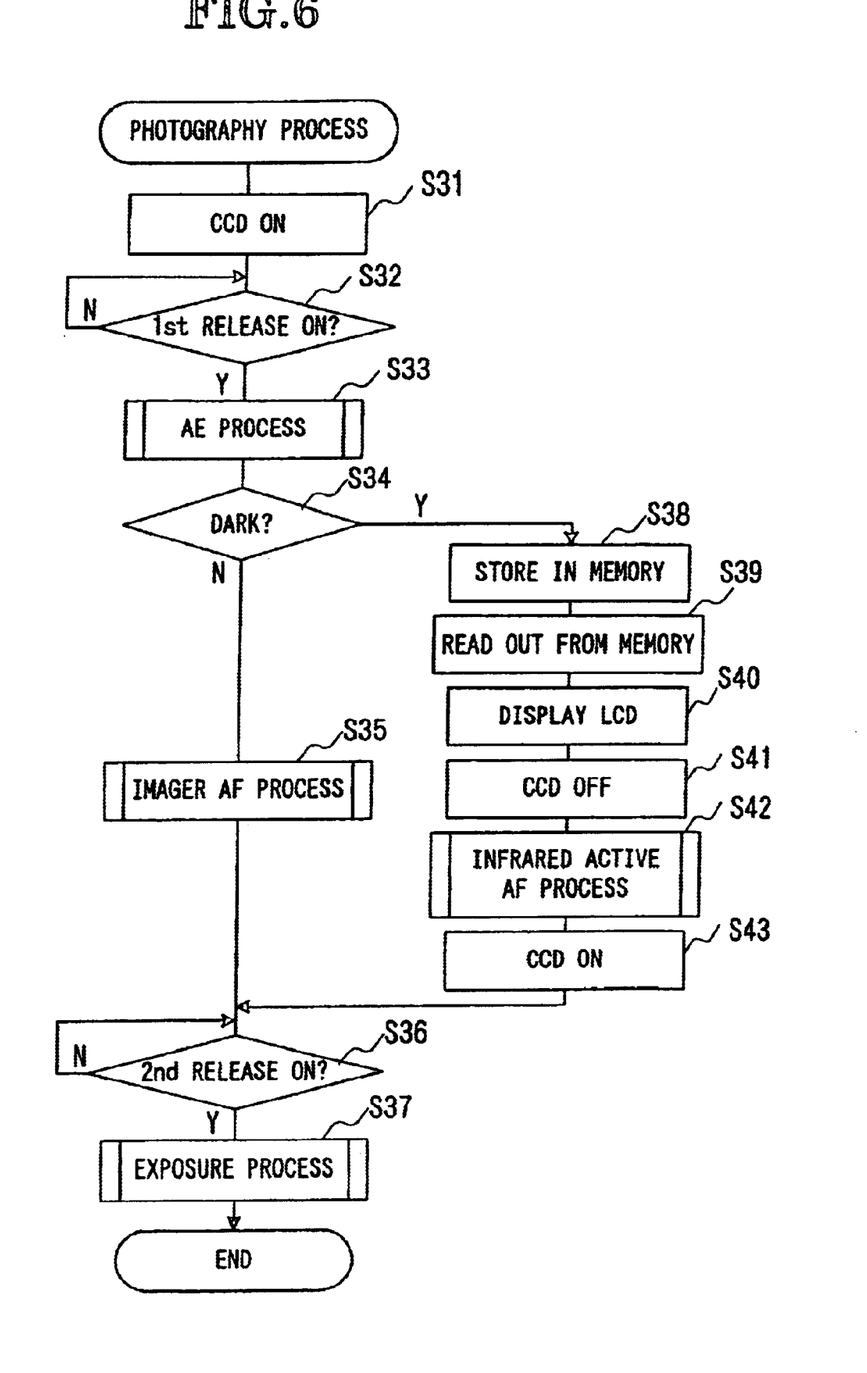
FIG. 6 is a flow chart illustrating a routine executed in this embodiment of the electronic imaging system when executing the imaging process.

FIG. 6 is a flow chart illustrating a routine executed in this embodiment of the electronic imaging system when executing the imaging process.

Again in this embodiment, the imaging process sequence is executed when the main power switch of the electronic imaging system 1 is "on" and the system 1 is in the imaging (or recording) mode and ready for imaging.

In step S31, the CPU 15 receiving an "on" signal from the main power supply switch or the like controls the battery 26 to bring about an "on" state of the system 1. At this time, the power supply to an imaging section of the CCD 5 is turned on (CCD-ON). In subsequent step S32, the CPU 15 checks the state of the 1-st release switch. When detecting that the 1-st release switch has been turned on, the CPU 15 executes step S33 and following steps. The step S33 and following steps S34 to S37 are entirely the same as the steps S3 to S7 in FIG. 2 described above.

When detecting in the step S34 (see step S4 in FIG. 2) that the photographic image containing the desired scene to be photographed is dark, the CPU 1 executes step S38.

In the step S38, the CPU 15 causes the memory controller 32 to control the memory 8 to tentatively store an image signal of the scene, which is focused on the CCD 5 at this instant (i.e., immediately before the start of the infrared active AF process after the AE process), in the memory 8. In subsequent step S39, the CPU 15 controls the D/A converter 9 to read out the image signal stored in the memory 8, convert the read-out image signal to an optimal form for display and output the converted image signal to the LCD 10. The LCD 10 displays the received converted image signal as still picture image (step S40).

In subsequent step S41, the CPU 15 switches the CCD 5 to the no power supply state or the stand-by state. In subsequent step S42, the CPU 15 executes the infrared active AF process. In subsequent step S43, the CPU 15 turns on again the power supply to the CCD 2 (see steps S8 and S9 in FIG. 2). Subsequently, the CPU 15 checks for a command signal from the 2-nd release switch (step S36). When detecting the command signal, the CPU 15 executes step S37 of the exposure process, thus bringing an end to the imaging process sequence.

As has been described, in this embodiment the image right before the AF process execution is displayed on the LCD 10. Thus, the image right before the imaging can be confirmed as still picture image during the infrared active AF process. It is thus possible to prevent the spoiling of the sense of use of the electronic imaging system 1.

As has been described in the foregoing, according to the present invention it is possible to provide an electronic imaging system, which comprises an imager AF means and an infrared active AF means, and in which an optimal AF means is automatically selected, when desired. Thus, it is possible to obtain more accurate focus detection. In addition, while always ensuring stable power supply state, the power consumption can be saved, thus contributing to energy saving.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An electronic imaging system comprising:
   a photographic optical system for focusing a scene image;
   an imaging means for converting the scene image focused by the photographic optical system to an image signal;
   a high frequency component detecting means for detecting high frequency components of the image signal obtained by the imaging means;
   a light detecting means including a light-emitting means for emitting light toward the scene and a light-receiving means for receiving light emitted by the light-emitting means and reflected from the scene;
   a driving means for controlling the focal point of the photographic optical system;
   a brightness detecting means for detecting the brightness of the scene; and
   a drive control means for controlling the driving means on the basis of the output of the high frequency detecting means or the light detecting means;

wherein the focal point control is performed on the basis of the output of the high frequency component detecting means when detecting, from the result of detection in the brightness detecting means, that the brightness of the scene is higher than a predetermined brightness, and the focal point control is performed on the basis of the output of the light detecting means when detecting, from the result of detection in the brightness detecting means, that the brightness of the scene is lower than the predetermined brightness, the output of the light detecting means being obtained by controlling a power supply to cut off current or supply a relatively low current flowing in the imaging means and then driving the light detecting means for emission of light toward the scene and reception of light reflected light from the scene.

2. The electronic imaging system of claim 1 further comprising:

an image display means for displaying the image signal obtained by the imaging means; and a recording means for recording the image signal obtained by the imaging means, wherein the recorded image is displayed on the image display means when detecting, from the result of detection in the brightness detecting means, that the brightness of the scene is lower than the predetermined brightness.

3. The electronic imaging system of claim 1 wherein the light detecting means is an infrared active autofocus signal generator.

4. An electronic imaging system comprising:

a photographic optical system for focusing a scene image;

an imaging means for converting the scene image focused by the photographic optical system to an image signal;

a high frequency component detecting means for detecting high frequency components of the image signal obtained by the imaging means;

a light detecting means including a light-emitting means for emitting light toward the scene and a light-receiving means for receiving light emitted by the light-emitting means and reflected from the scene;

a driving means for controlling the focal point of the photographic optical system;

a brightness detecting means for detecting the brightness of the scene; and a drive control means for controlling the driving means on the basis of the output of the high frequency detecting means or the light detecting means; and a battery voltage detecting means for detecting the voltage of a power supply battery;

wherein the focal point control is performed on the basis of the output of the high frequency component detecting means when detecting, from the result of detection in the brightness detecting means, that the brightness of the scene is higher than a predetermined brightness, and the focal point control is performed on the basis of the output of the light detecting means when detecting, from the result of detection in the brightness detecting means, that the brightness of the scene is lower than the predetermined brightness, and if it is detected that the result of detection in the battery voltage detecting means is lower than a predetermined value, the output of the light detecting means being obtained by controlling the power supply battery to cut off current or supply a relatively low current flowing in the imaging means and then driving the light detecting means for emission of light toward the scene and reception of light reflected from the scene.

5. The electronic imaging system of claim 4 wherein the light detecting means is an infrared active autofocus signal generator.

6. A method, for use with an electronic imaging system having an optical system for focusing a scene image, means for converting the scene image, focused by the optical system, to an image signal, a brightness detector for detecting a brightness of the scene image, a high frequency component detector for detecting high frequency components of the scene image, and an active auto-focus signal generator for generating a signal based on a distance to the scene image, for generating a focus control signal, the method comprising steps of:

a) determining a brightness with the brightness detector;

b) comparing the brightness detected in step (a) with a predetermined brightness threshold value;

c1) if the brightness detected in step (a) is greater than the predetermined brightness threshold value, then generating the focus control signal based on high frequency components of the scene image detected by the high frequency component detector; and c2) if the brightness detected in step (a) is less than the predetermined brightness threshold value, then
  i) decreasing power supplied to the means for converting the scene image to an image signal,
  ii) generating the focus control signal based on the signal generated by the active auto-focus signal generator, and
  iii) increasing the power supplied to the means for converting the scene image to an image signal.

7. The method of claim 6 further comprising a step of:

d) performing an image exposure process.

8. The method of claim 7 wherein the electronic imaging system includes a two-stage release switch, and wherein the step of performing an image exposure process is performed after a second release of the two-stage release switch.

9. The method of claim 6 wherein the electronic imaging system includes a two-stage release switch, the method further comprising a step of turning on the means for converting the scene image to an image signal after a first release of the two-stage release switch but before the step of determining a brightness.

10. A method, for use with an electronic imaging system having an optical system for focusing a scene image, means for converting the scene image, focused by the optical system, to an image signal, a brightness detector for detecting a brightness of the scene image, a high frequency component detector for detecting high frequency components of the scene image an active auto-focus signal generator for generating a signal based on a distance to the scene image, a battery power supply, and means for determining a residual capacity of the battery power supply, for generating a focus control signal, the method comprising steps of:

a) determining a brightness with the brightness detector;
b) comparing the brightness detected in step (a) with a predetermined brightness threshold value;
c1) if the brightness detected in step (a) is greater than the predetermined brightness threshold value, then generating the focus control signal based on high frequency components of the scene image detected by the high frequency component detector; and
c2) if the brightness detected in step (a) is less than the predetermined brightness threshold value, then
  i) determining a residual capacity of the battery power supply,
  ii) if it is determined that the residual capacity of the battery power supply is greater than a predetermined threshold, then generating the focus control signal based on the signal generated by the active auto-focus signal generator, and
  iii) if it is determined that the residual capacity of the battery power supply is less than the predetermined threshold, then
    A) decreasing power supplied to the means for converting the scene image to an image signal,
    B) generating the focus control signal based on the signal generated by the active auto-focus signal generator, and
    C) increasing the power supplied to the means for converting the scene image to an image signal.

11. The method of claim 10 further comprising a step of:
d) performing an image exposure process.

12. The method of claim 11 wherein the electronic imaging system includes a two-stage release switch, and
wherein the step of performing an image exposure process is performed after a second release of the two-stage release switch.

13. The method of claim 10 wherein the electronic imaging system includes a two-stage release switch, the method further comprising a step of turning on the means for converting the scene image to an image signal after a first release of the two-stage release switch but before the step of determining a brightness.

14. A method, for use with an electronic imaging system having
an optical system for focusing a scene image,
means for converting the scene image, focused by the optical system, to an image signal,
a brightness detector for detecting a brightness of the scene image,
a high frequency component detector for detecting high frequency components of the scene image,
an active auto-focus signal generator for generating a signal based on a distance to the scene image,
a memory for storing an image based on the image signal, and
a display for displaying the image stored in the memory,
for generating a focus control signal, the method comprising steps of:
a) determining a brightness with the brightness detector;
b) comparing the brightness detected in step (a) with a predetermined brightness threshold value;
c1) if the brightness detected in step (a) is greater than the predetermined brightness threshold value, then generating the focus control signal based on high frequency components of the scene image detected by the high frequency component detector; and
c2) if the brightness detected in step (a) is less than the predetermined brightness threshold value, then
  i) storing an image based on the image signal in the memory,
  ii) reading the stored image from the memory,
  iii) displaying the stored image read on the display,
  iv) decreasing power supplied to the means for converting the scene image to an image signal,
  v) generating the focus control signal based on the signal generated by the active auto-focus signal generator, and
  vi) increasing the power supplied to the means for converting the scene image to an image signal.

15. The method of claim 14 further comprising a step of:
d) performing an image exposure process.

16. The method of claim 15 wherein the electronic imaging system includes a two-stage release switch, and
wherein the step of performing an image exposure process is performed after a second release of the two-stage release switch.

17. The method of claim 14 wherein the electronic imaging system includes a two-stage release switch, the method further comprising a step of turning on the means for converting the scene image to an image signal before a first release of the two-stage release switch and the step of determining a brightness.

* * * * *